(12) United States Patent
Kajouke et al.

(10) Patent No.: US 7,599,204 B2
(45) Date of Patent: Oct. 6, 2009

(54) CONTROL SCHEME PROVIDING A FREEWHEELING PERIOD IN A CYCLO-CONVERTER AND A HIGH FREQUENCY INVERTER

(75) Inventors: Lateef A. Kajouke, San Pedro, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 480 days.

(21) Appl. No.: 11/468,005

(22) Filed: Aug. 29, 2006

(65) Prior Publication Data
US 2008/0055954 A1 Mar. 6, 2008

(51) Int. Cl.
*H02M 5/25* (2006.01)

(52) U.S. Cl. .................. 363/159; 363/157; 363/163

(58) Field of Classification Search .............. 363/8, 363/78, 95, 157, 159, 163, 164, 165
See application file for complete search history.

(56) References Cited

U.S. PATENT DOCUMENTS

| 5,189,603 | A | * | 2/1993 | Sashida et al. | ............... 363/160 |
| 5,285,365 | A | * | 2/1994 | Yamato et al. | ................. 363/8 |
| 2006/0062034 | A1 | * | 3/2006 | Mazumder et al. | .......... 363/131 |

OTHER PUBLICATIONS

Nge C.L. et al; Modified Natural Commutated Switching Technique for HF Link Inverter; Power Electronics and Applications, 2005 European Conference on; 7 pp.*

* cited by examiner

*Primary Examiner*—Jeffrey L Sterrett
*Assistant Examiner*—Matthew Grubb (57) ABSTRACT

A method includes controlling the cyclo-converter 7 in coordination with controlling a coupled HF inverter 3. The controlling of the cyclo-converter 7 provides at least a first freewheeling FW period in the cyclo-converter for each cycle of the HF inverter 3. The controlling of the HF inverter provides a freewheeling period in the HF inverter 3 each time the first freewheeling period is provided in the cyclo-converter.

9 Claims, 9 Drawing Sheets

CONTROL SCHEME PROVIDING A FREEWHEELING PERIOD IN A CYCLO-CONVERTER AND A HIGH FREQUENCY INVERTER

BACKGROUND OF THE INVENTION

1. Field of the Invention

The present invention relates to electric vehicles and hybrid electric vehicles. In particular, the invention relates to auxiliary power systems used by such vehicles to supply auxiliary power.

2. Description of Related Art

The assignee of the present invention designs and develops electric and hybrid-electric vehicles and power systems for use therein. Prior art related to power systems include a description of auxiliary power systems where the main power system for traction drive is tapped to provide auxiliary power for other purposes. The auxiliary power system may be used to provide electric power for other electric appliances that are normally built in, or come with, the vehicle, such as a radio, headlights, air conditioning blowers, etc. At other times, the auxiliary electric power system may be called upon to provide electric power for electric appliances that are frequently "plugged" into the vehicle, such as a cigarette lighter and power packs for recharging cell phones, laptop computers, and other devices that typically plug into the cigarette lighter socket. At still other times, the auxiliary electric power system may be called upon to provide 110 V ac or dc electric power for electric appliances normally unassociated with the vehicle, for example, an electric shaver or an electric tool such as an electric power saw, an electric power drill, an electric power grinder or a variety of electric appliances for use when the vehicle is used for camping or fishing.

Figure 1:
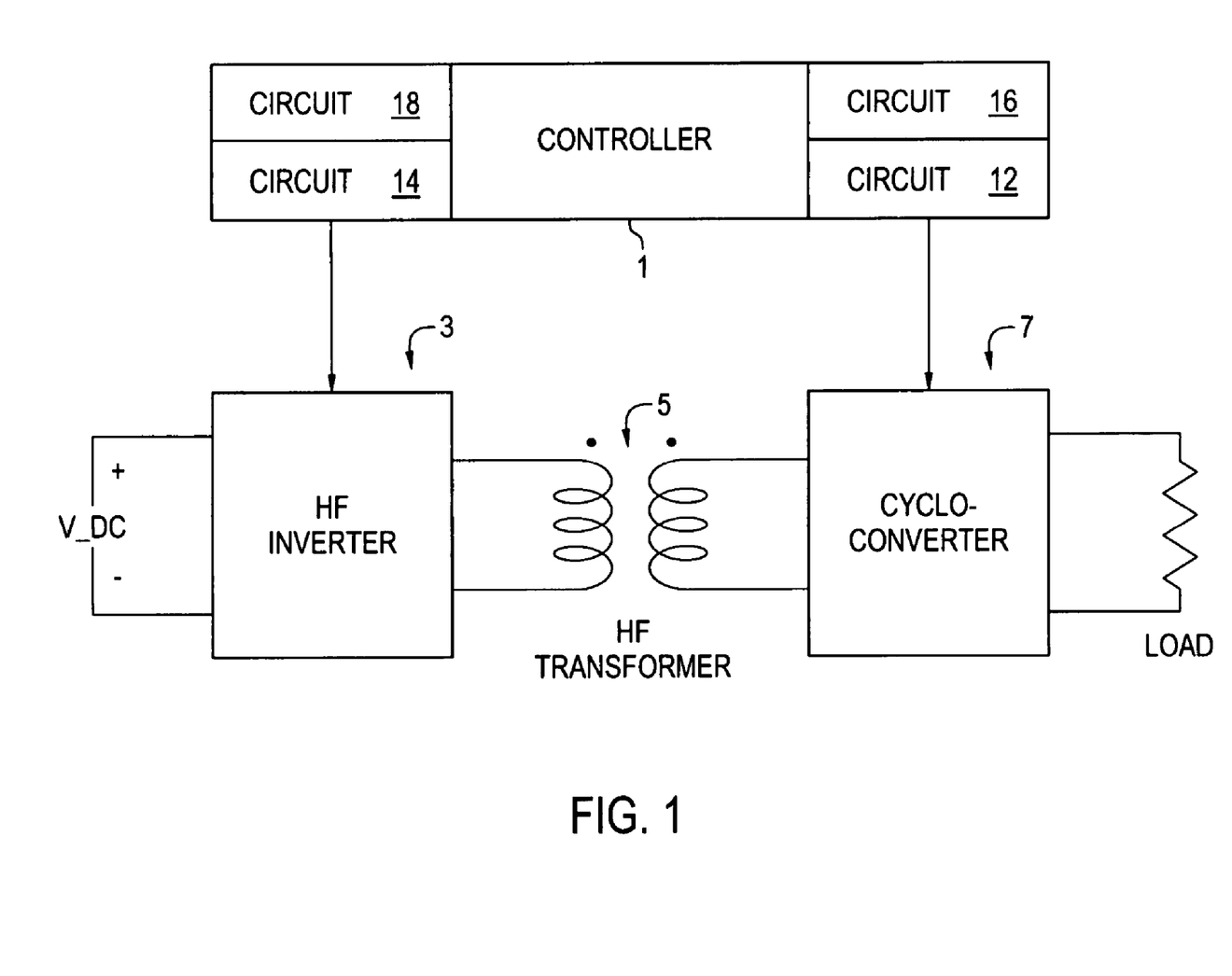
FIG. 1 is a function block diagram depicting a dc to ac system of the type controlled according to the present invention.
Figure 2:
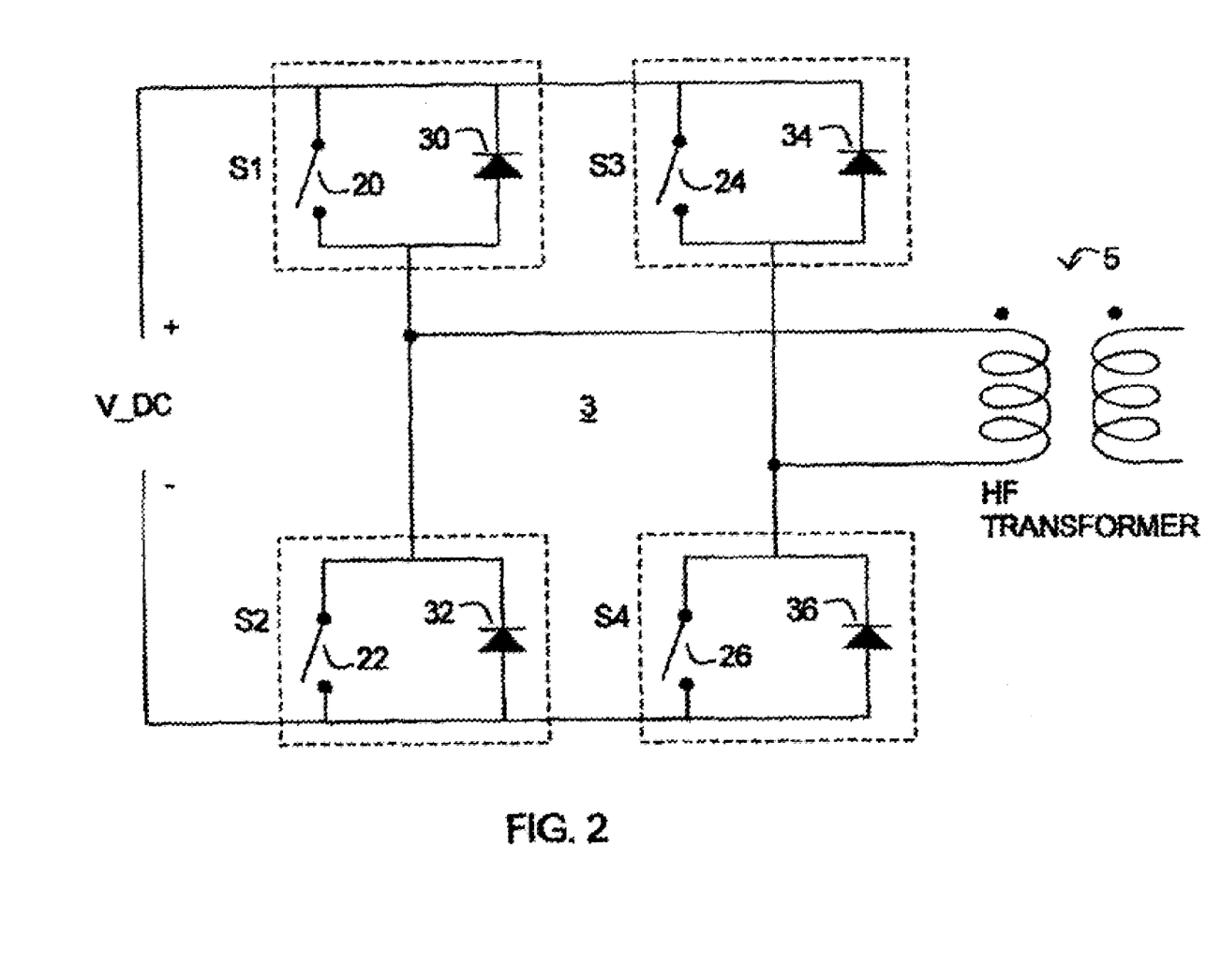
FIG. 2 is a schematic diagram of the HF inverter of FIG. 1.

In operation, the switching frequency of HF inverter 3 is selected between 3000 and 30,000 Hz. HF inverter 3 converts the dc supply voltage V_DC into square wave power pulses that pass through HF transformer 5 to be applied between the A_BUS and B_BUS of cyclo-converter 7.

FIG. 1 depicts an auxiliary power system that includes a dc power source, a high frequency inverter 3, a high frequency transformer 5 and a cyclo-converter 7 connected to a load. Switches within high frequency inverter 3 and cyclo-converter 7 are controlled by controller 1. The different ways in which these switches are controlled differentiates between a known system and an embodiment of the present invention.

FIG. 2 depicts the high frequency inverter 3 (HF inverter 3), coupled between the dc voltage (V_DC) from the dc power source and the high frequency transformer 5 (HF transformer 5). The HF inverter includes four switches S1, S2, S3, S4. Switch S1 includes a bypass diode 30 and a corresponding active switch element 20. Similarly, switches S2, S3, S4 include bypass diodes 32, 34, 36 and corresponding active switch elements 22, 24, 26.

Active switch element 20 of switch S1 is capable of either conducting current or blocking current conduction from V_DC to the HF transformer depending on a control signal applied to active switch element 20. Bypass diode 30 is capable of conducting current from the HF transformer toward V_DC, but not the other way. Similarly, active switch element 24 of switch S3 is capable of selectively conducting current or blocking current conduction from V_DC to the HF transformer. Bypass diode 34 is capable of conducting current from the HF transformer toward V_DC, but not the other way.

Active switch element 22 of switch S2 is capable of either conducting current or blocking current conduction from the HF transformer to V_DC depending on a control signal applied to active switch element 22. Bypass diode 32 is capable of conducting current from V_DC toward the HF transformer, but not the other way. Similarly, active switch element 26 of switch S4 is capable of selectively conducting current or blocking current conduction from the HF transformer to V_DC. Bypass diode 36 is capable of conducting current from V_DC toward the HF transformer, but not the other way. The active switch elements 20, 22, 24, 26 typically include an insulate gate bipolar transistor (IGBT). Although other switch technologies may be used.

In operation, the switching frequency of HF inverter 3 is selected between 3000 and 30,000 Hz. HF inverter 3 converts the dc supply voltage V_DC into square wave power pulses that pass through HF transformer 5 to be applied between the A_BUS and B_BUS of cyclo-converter 7.

Figure 3:
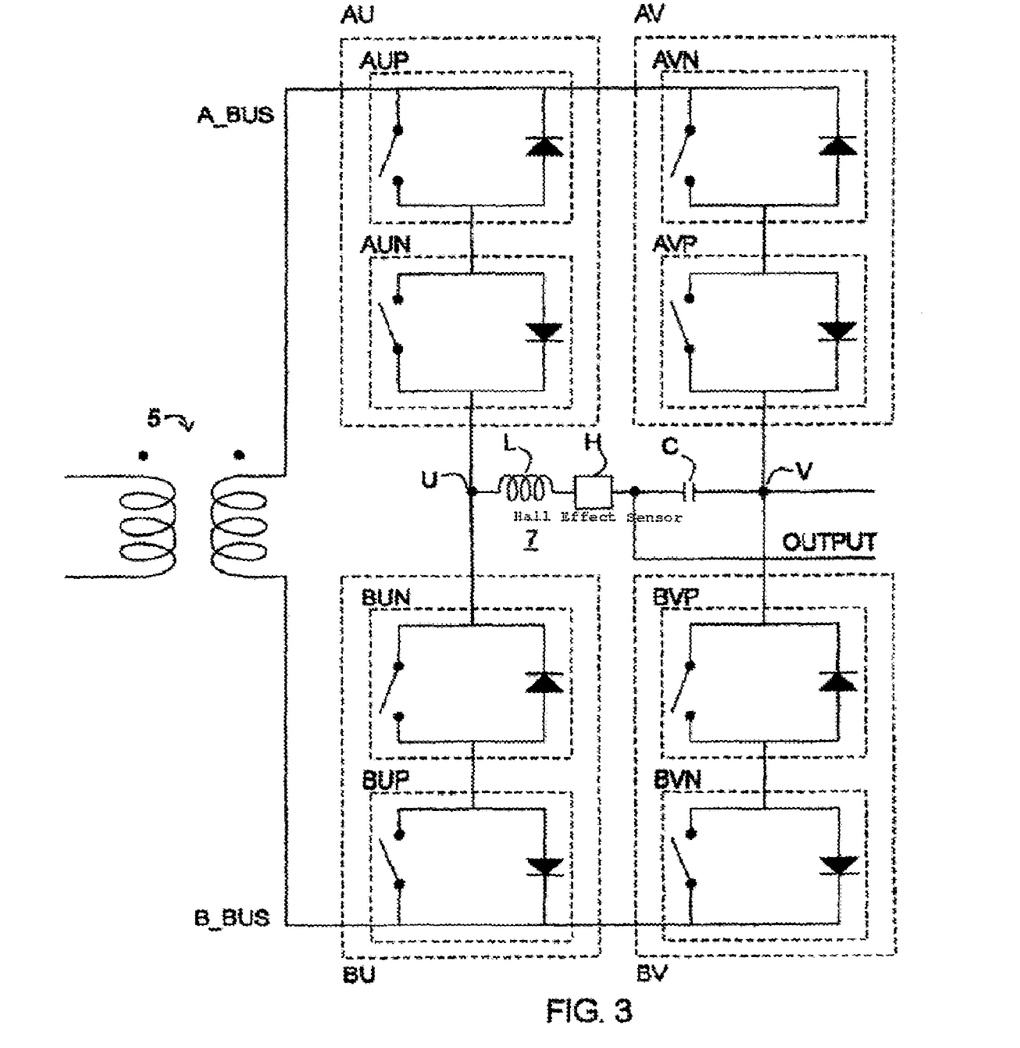
FIG. 3 is a schematic diagram of the cyclo-converter of FIG. 1.

FIG. 3 shows the HF transformer 5 and cyclo-converter 7. Cyclo-converter 7 includes four switch pairs AU, BU, AV and BV, arranged in a bridge configuration. Transformer 5 is coupled to the bridge by A_BUS and B_BUS (the A and B terminals of the bridge). A load side filter includes inductor L, Hall effect sensor H and capacitor C. The load side filter is coupled to the bridge between terminals U and V.

Each switch pair includes two switches. Switch pair AU is connected to the A_BUS and includes switches AUP and AUN, and switch pair AV is also connected to the A_BUS and includes switches AVP and AVN. Switch pair BU is connected to B_BUS and includes switches BUP and BUN, and switch pair BV is also connected to B_BUS and includes switches BVP and BVN. Switches AUP, AVN, BUN and BVP function exactly like any of the switches S1, S2, S3 or S4 of FIG. 2. Switches AUN, AVP, BUP and BVN function similarly, except the bypass diodes are connected in the opposite direction of the diodes of switches AUP, AVN, BUN and BVP and except the active switch elements selectively conducts current in the opposite direction of the switch elements of switches AUP, AVN, BUN and BVP.

Controller 1 controls the two switch elements of each switch pair to create potentially four operation states. Switch pair AU will be used as an example. AU is OFF when no current can flow from the A_BUS through switch pair AU to inductor L, or back. In the OFF state, both switch elements block current flow, and the two diodes are back biased to block current flow. In the ON state, both switch elements are conductive so that current can flow both ways through switch pair AU.

In a third state, the switch element of switch AUP is on to permit one way conduction, and the switch element of switch AUN is off to block all conduction so that current flows from the A_BUS through the switch element of switch AUP through the diode of switch AUN to inductor L. However, current flow is blocked by both the diode and the switch element of switch AUN so that current from inductor L is blocked from flowing through switch AUN through switch AUP to the A_BUS.

In a fourth state, the switch element of switch AUN is on to permit one way conduction, and the switch element of switch AUP is off to block all conduction so that current flows from inductor L through the switch element of switch AUN through the diode of switch AUP to the A_BUS. However, current flow is blocked by both the diode and the switch element of switch AUP so that, current from the A_BUS is blocked from flowing through switch AUP through switch AUN to inductor L.

Each of the other switch pairs, AV, BU and BV, operate similarly so that each produces four operational states controlled by controller 1 (FIG. 1). Cyclo-converter 7 is capable of being controlled to be in any one of 256 different conduction states.

The power pulses propagating through the HF transformer are applied to cyclo-converter 7 (FIG. 3) to make the A_BUS positive with respect to the B_BUS for one half cycle and makes the B_BUS positive with respect to the A_BUS for the other half cycle. By using the correct cycling of the switches AUP, AVN, BUN, BYP, AJIN, AVP, BUP and BVN, the current from both half cycles can be passed through inductor L in the same direction.

A first mode is defined as when current is passed from the U node into the inductor. In the first mode, controller 1 (FIG. 1) controls all of the switch elements of cyclo-converter 7 to cause the voltage on node U to be more positive than the voltage on node V.

Figure 4:
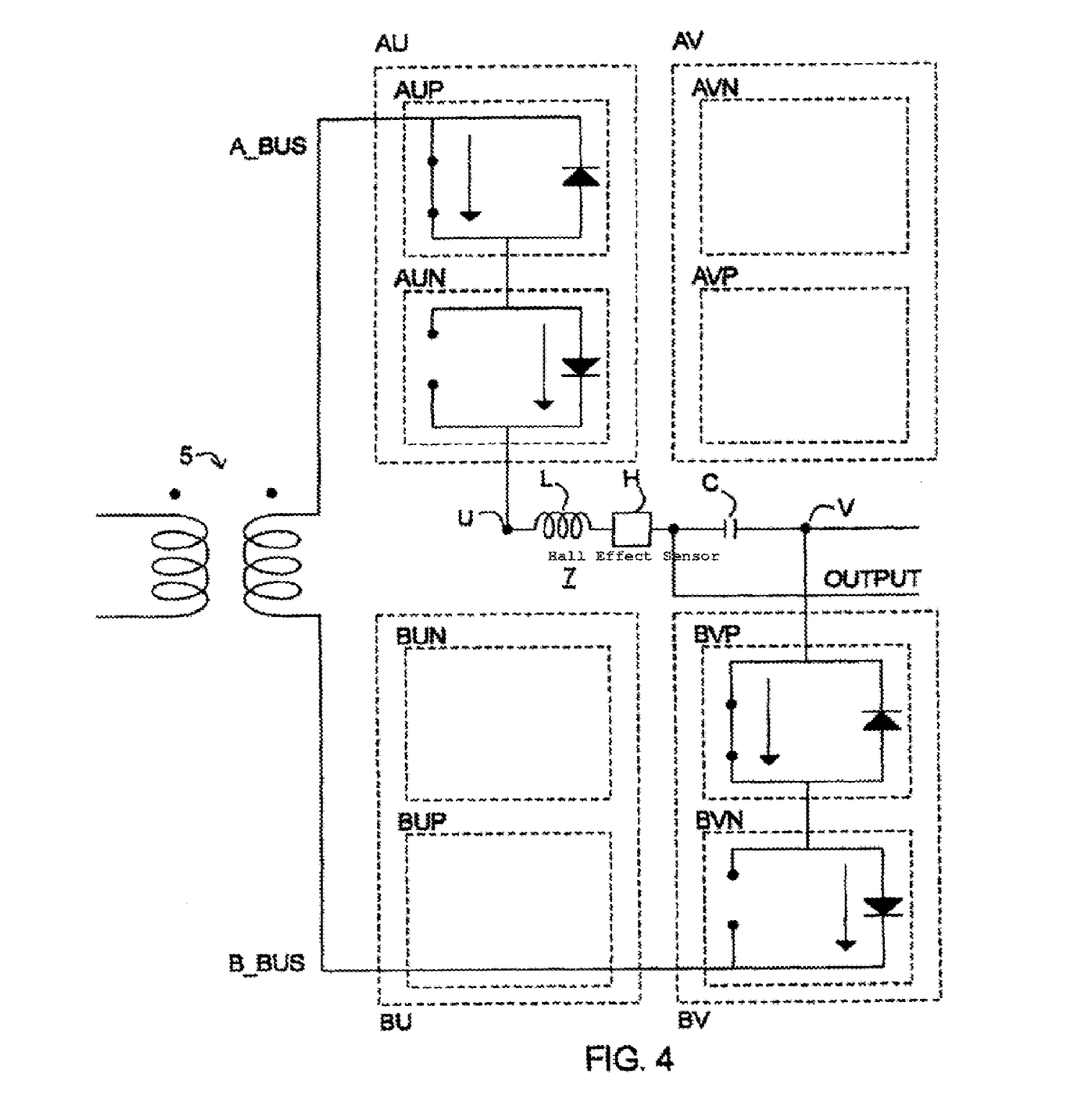
FIG. 4 is a circuit schematic diagram of the cyclo-converter of FIG. 3 showing one operational setting of the switches for a power transfer condition.
Figure 6:
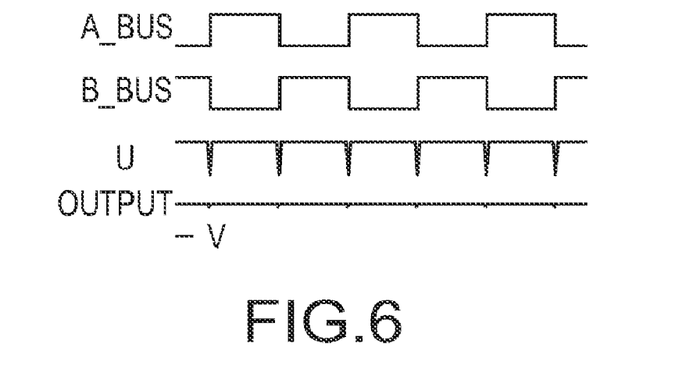
FIG. 6 is a timing diagram showing a power transfer condition.

A first half cycle is defined to be when the voltage on the A_BUS is positive with respect to the voltage on the B_BUS (see FIG. 6, A_BUS). Referring to FIG. 4, during the first half cycle, the voltage on the A_BUS can be passed from the A_BUS through the switch element of switch AUP, through the diode of switch AUN onto node U. At the same time, current can be drawn from node V through the switch element of switch BVP, through the diode of switch BVN to the B_BUS until the voltage on node V is substantially the same (less voltage drops across the switches of switch pair BV) as the voltage on the B_BUS.

Figure 5:
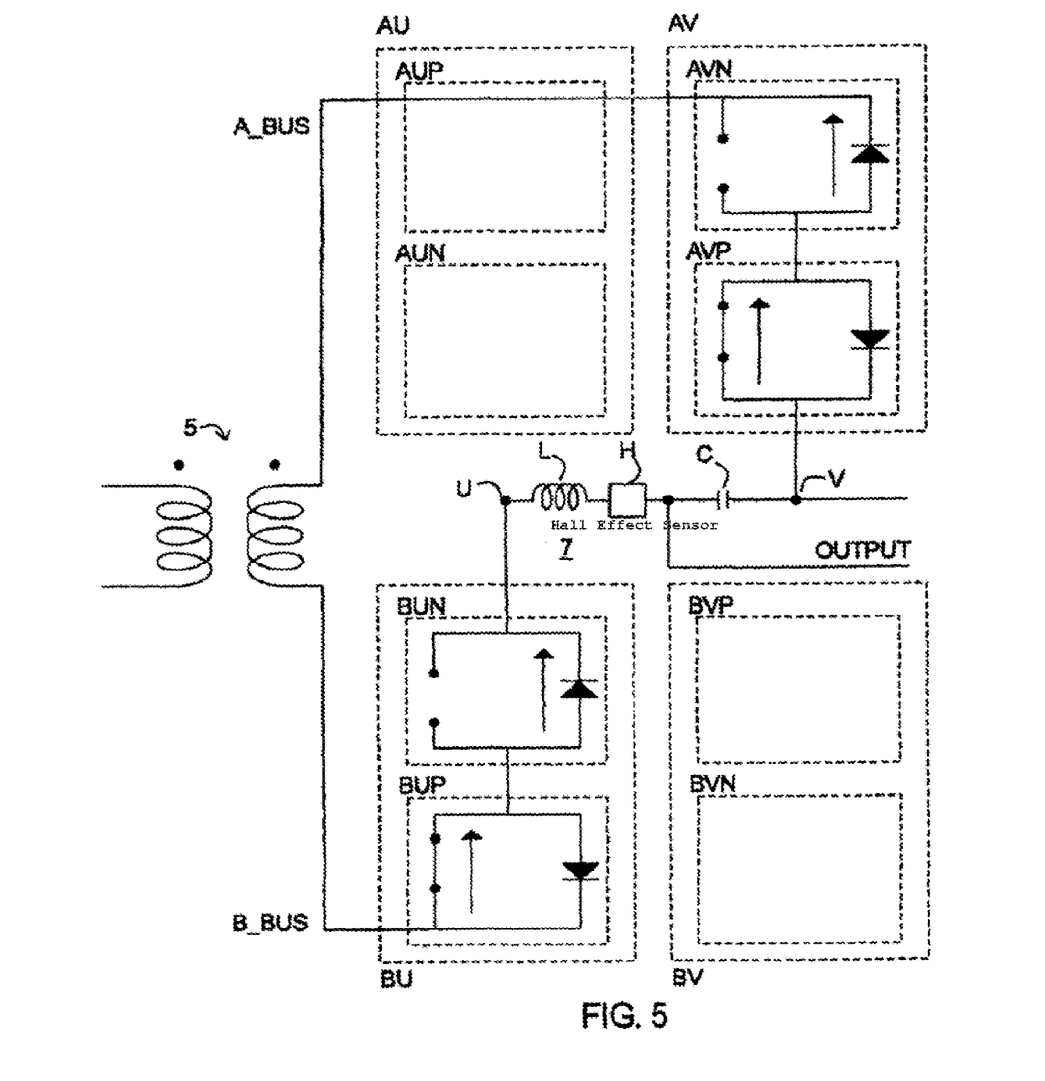
FIG. 5 is a circuit schematic diagram of the cyclo-converter of FIG. 3 showing another operational setting of the switches for a power transfer condition.

The other half cycle is defined to be when the voltage on the B_BUS is positive with respect to the voltage on the A_BUS (see FIG. 6, B_BUS). Referring to FIG. 5, during the other half cycle, the voltage on the B_BUS can be passed from the B_BUS through the switch element of switch BUP, through the diode of switch BUN onto node U. At the same time, current can be drawn from node V, through the switch element of switch AVP, through the diode of switch AVN to the A_BUS until the voltage on node V is substantially the same (less voltage drops across the switches of switch pair BV) as the voltage on the A_BUS.

Thus, in this first mode, regardless of whether the A_BUS is more positive that the B_BUS or the other way around, the switches can be operated by controller 1 to apply a voltage to node U that is more positive than the voltage applied to node V. Controller 1 causes the switches to apply the positive power pulse to the U node. In this way, node U can develop a positive dc voltage relative to the voltage on node V, with periodic switching spikes (see FIG, 6, U). Capacitor C and inductor L constitute a load end filter that substantially removes the switching spikes (see FIG. 6, OUTPUT).

Similarly, in a second mode, the switches can he operated to apply a voltage to node V that is more positive than the voltage applied to node U. In this way, node U can develop a negative dc voltage referenced to the voltage on node V.

By alternating between the above described first and second modes, an alternating voltage waveform can be provided between nodes U and Y where the rate of switching between the first and second modes may be selected arbitrarily in a range between dc (i.e., either the first mode or the second mode, but not alternating modes) and a frequency just below the switching frequency of the HF inverter.

The particular frequency of alternations between the first and second modes is defined by the logic in the controller 1 which generates the control signals that operate the switches in cyclo-converter 7. In most systems, the frequency of alternations between the first and second modes and back will be 60 Hz to be compatible with loads designed to operate on terrestrial ac power systems that operate at 60 Hz, However, other frequencies are also desirable such as 400 Hz, 900 Hz and even 1,600 Hz, since these frequencies are also used in standard ac power systems, Hall effect sensor H, capacitor C and inductor L form a filter that spans across nodes U and V. The filter constant, RC, of this filter is designed as a low pass filter to remove frequencies higher than the frequency of alternations between the first and second modes. Often, during switching between the switch states of cyclo-converter 7, spikes of voltage may momentarily be applied across nodes U and V. The filter, comprised of capacitor C and inductor L, absorbs and filters out these voltage spikes to provide a smoother voltage between nodes U and V, Hall effect sensor H provides feedback to controller 1 to inform the controller of the current direction passing through inductor L.

In typical operation, HF inverter 3 switches at a sufficient rate that a full cycle repeats at a predetermined rate that may be selected between from 2,000 Hz to 40,000 Hz, or more typically between 3,000 Hz to 30,000 Hz. During a first half cycle switches S1 and S4 are turned on while switches S2 and S3 are turned off so that current flows into the dotted side of transformer 5, and the voltage V_DC from the & power source is applied to transformer 5 so that the voltage applied to the dotted side of the primary winding of transformer 5 is more positive than the voltage applied to the other side of the primary winding. During the other half cycle, switches S2 and S3 are turned on while switches S1 and S4 are turned off so that current flows out of the dotted side of transformer 5, and the voltage V_DC from the dc power source is applied to transformer 5 so that the voltage applied to the dotted side of the primary winding of transformer 5 is more negative than the voltage applied to the other side of the primary winding. By alternating these half cycles, a square wave voltage is applied to the primary winding of transformer 5. Switches S1 and S4 are closed for a first half cycle while switches S2 and S3 are open so that current flows through the primary of transformer 5 in one direction. Then, for the other half cycle switches S2 and S3 are closed while switches S1 and S4 are open so that current flows through the primary of transformer 5 in the opposite direction. Generally, the size of the transformer, and in particular the core material of the transformer, the windings, etc. of the transformer, are selected so that the core material does not become magnetically saturated during a half cycle.

When controller 1 operates cyclo-converter 7 as discussed above with respect to FIGS. 4 and 5, the power transferred to the cyclo-converter output OUTPUT (FIGS. 4, 5) is maximized using the timing sequence depicted in FIG. 6. This operation is referred to as the power transfer period (PT period).

However in many instances, less than full power transfer is desired. To achieve this, pulse width modulation (PMW) of the switches in cyclo-converter 7 is employed. To understand PWM, consider only the first mode described above with respect to FIGS. 4 and 5, where the switches of cyclo-converter 7 are operated by controller 1 to apply a voltage to node U that is more positive than the voltage applied to node V regardless of whether the A_BUS is more positive than the B_BUS or the other way around. During a first half cycle of the HF inverter cycle (50% duty cycle of the full cycle), switches of switch pair AU are operated to apply a positive voltage from the A_BUS to node U, and during the other half cycle (50% duty cycle of the full cycle), switches of switch pair BU are operated to apply a positive voltage from the B_BUS to node U as discussed above. See FIG. 6.

In order to provide less than full power transfer, each half cycle (50% duty cycle of the full cycle) is divided into a power transfer PT period (like the first or second modes discussed above) and a freewheeling FW period. For example, in the first half cycle the power transfer PT period might be 25% of the full cycle, and the freewheeling period might be 25% of the full cycle (see FIG. 7). Then, in the other half cycle, the power transfer PT period might also be 25% of the full cycle, and the freewheeling period might also be 25% of the full cycle (see FIG. 7).

Figure 7:
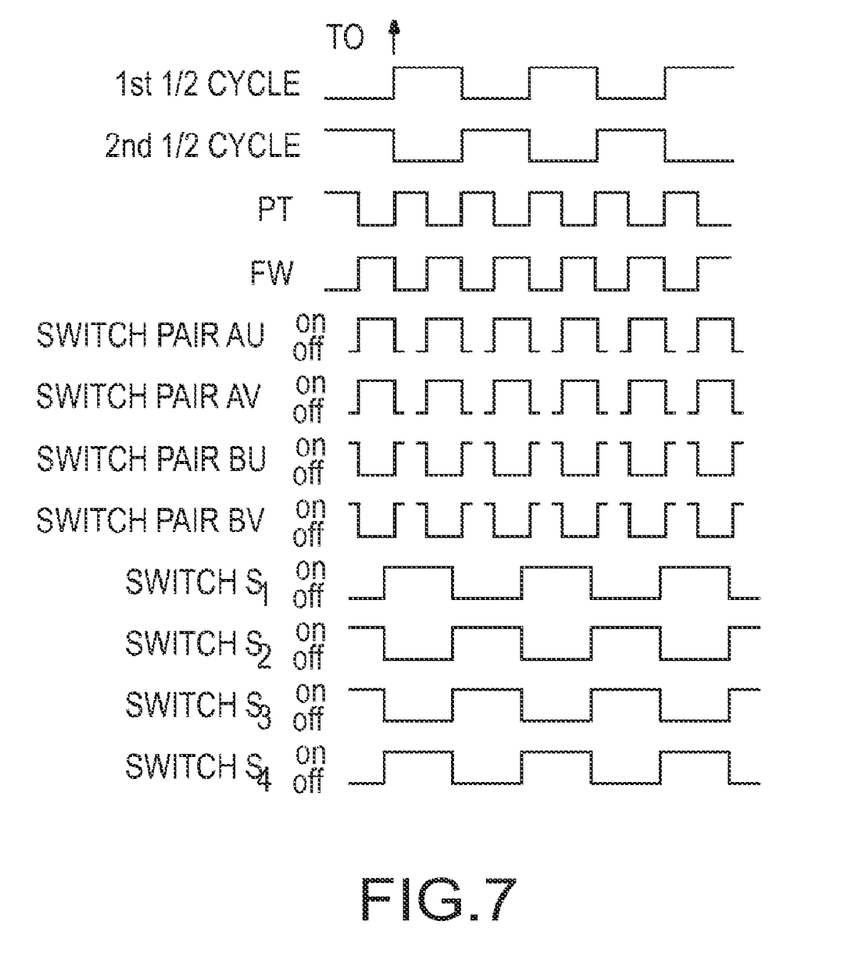
FIG. 7 is a timing diagram showing a PWM controlled power transfer condition with a freewheeling period.
Figure 8:
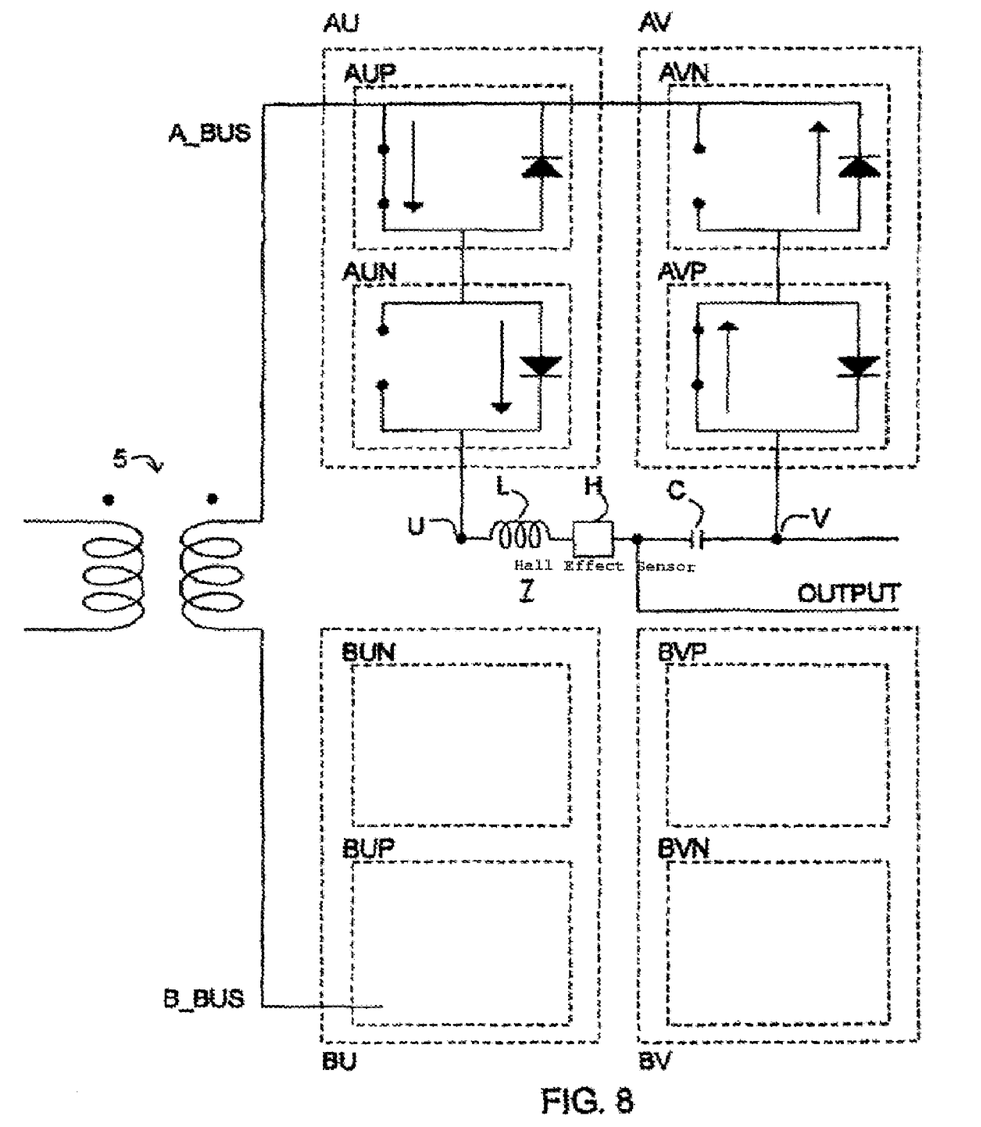
FIG. 8 is a circuit schematic diagram of the cyclo-converter of FIG. 3 showing one operational setting of the switches for a freewheeling condition.
Figure 9:
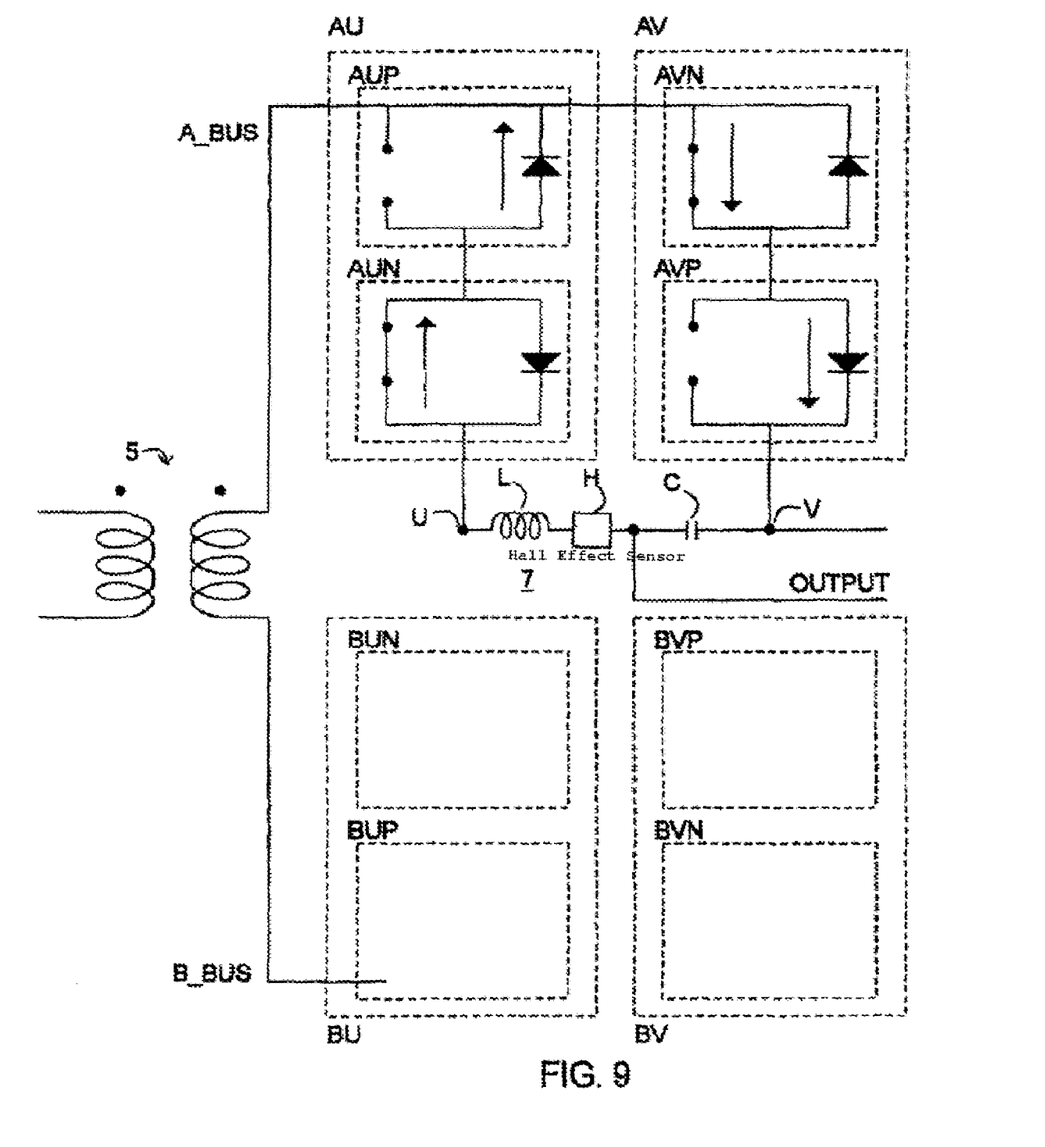
FIG. 9 is a circuit schematic diagram of the cyclo-converter of FIG. 3 showing another operational setting of the switches for a freewheeling condition.

In FIG. 7, first and second half cycles are depicted in the first and second rows, respectively. Reference time T0 begins at the beginning of the first half cycle. The first half cycle begins with a PT period followed by a FW period, and the second half cycle begins with a PT period followed by a FW period. The last four rows of FIG. 7 depict the on or off state of switch pairs AU, AV, BU and BV, but only during the FW period. The operation of the switches during the PT period is as discussed above. During the FW period, switch pairs ATU and AV are on so as to conduct current as depicted in FIG. 8 when current flows from node U into inductor L, and as depicted in FIG. 9 when current flows from inductor L into node U. However, switch pairs AU and AV might also be on for current flowing in either direction. Also during the FV period, switch pairs BU and BV are off so that nodes U and V are isolated from the B_BUS as depicted in FIGS. 8 and 9. During the freewheeling period, the U and V nodes are short circuited together. In this way, only half of the maximum power is transferred through cyclo-converter 7.

During a freewheeling period, controller 1 controls the switches of cyclo-converter 7 so that nodes U and V are shorted together. One way to do this is to short the A_BUS to both the U and V nodes. Another way to do this is to short the B_BUS to both the U and V nodes. If current is flowing from inductor L through Hall effect sensor H into capacitor C, the switch elements of switches AUP and AVP are turned on as depicted in FIG. 8. Current continues to flow in a circuit from capacitor C through the switch element of switch AVP through the diode of switch AVN onto the A_BUS, then through the switch element of switch AUP, through the diode of switch AUN and back into inductor L. The voltage between nodes U and V is short circuited together and clamped to the voltage of the A_BUS except for some small voltage drops across the switches. Controller 1 is aware of the direction of the current flow because Hall effect sensor H senses the current direction and reports the direction to the controller.

Similarly, if current is flowing from capacitor C through Hall effect sensor H into inductor L, the switch elements of switches AUN and AVN are turned on as depicted in FIG. 9. Current continues to flow in a circuit from inductor L through the switch element of switch AUN through the diode of switch AUP onto the A_BUS, then through the switch element of switch AVN, through the diode of switch AVP and back into capacitor C. The voltage between nodes U and V is short circuited and clamped to the voltage of the A_BUS except for some small voltage drops across the switches. Controller 1 is aware of the direction of the current flow because Hall effect sensor H senses the current direction and reports the direction to the controller.

Alternatively, controller 1 could control the switch elements of switches AUP, AVP and AUN, AVN to be on during the FW period, and there would be no need to sense the current direction front Hall effect sensor H. This arrangement would clamp together the voltages on nodes U and V.

Alternatively, controller 1 could control the switches of cyclo-converter 7 during the freewheeling period to clamp the voltages between nodes U and V by similarly controlling the switch elements of switches BUP and BVP to be on during one half cycle and similarly controlling the switch elements of switches BUN and BVN to be on during the other half cycle. Also, in an alternative variant, controller 1 could control the switches of cyclo-converter 7 during the freewheeling period so that the switch elements of switches BUP, BUN, BVN and BVP are all on regardless of the direction of current flow.

In any case of freewheeling discussed above, power is not transferred through the cyclo-converter 7 during the freewheeling period because the voltage between nodes U and V is shorted together. This reduces the amount of power being transferred into inductor L and capacitor C. In the specific exemplary case where the power transfer period is 25% of the full cycle during the first half cycle, the freewheeling period is 25% of the full cycle. In the other half cycle, the power transfer period is 25% of the full cycle, and the freewheeling period is 25% of the full cycle. Therefore, only 50% (e.g., 25% of each half cycle) of the maximum transferable power is actually transferred through cyclo-converter 7. The filter constant, LC, of the filter between nodes U and Y is chosen to have a time constant LC that smoothes out the HF power pulses (see FIG. 7). This will average out the fluctuations in the output terminal (i.e., the node between capacitor C and Hall effect sensor H) and node V. In this context, capacitor C functions as a shunt capacitor between the output terminal OUTPUT (i.e., the node between capacitor C and Hall effect sensor H) and node V, and inductor L functions as an input choke to reduce voltage spikes before reaching the output terminal OUTPUT.

To achieve a sinusoidal shaped voltage output waveform, controller 1 controls the switches of cyclo-converter 7 to modulate the percentage of a half cycle that is used for freewheeling periods and the corresponding percentage of the half cycle that is used for power transfer periods. Initially, all of the half cycle (i.e., 50% of the full cycle) is used for the freewheeing periods, and none of the half cycle is used for the power transfer period. Thus, initially, the voltage output of the cyclo-converter is zero. The percentage of the half cycle that is used for the power transfer period is gradually increased until a peak is reached and then the percentage is gradually decreased to zero again. The corresponding percentage of the half cycle used for the freewheeling period is correspondingly gradually decreased to a minimum and then gradually increased. The exact rate of increases and decreases in these percentages is selected to provide a half period of sinusoidal output voltage at the output terminal OUTPUT referenced to node V at the desired output frequency, for example 60 Hz. For example, if the desired output frequency is 60 Hz, the half period would be 1/120 part of a second or eight and one-third milliseconds. Triangular or square wave waveforms may also be produced by controlling the switches of the cyclo-converter in this way.

In addition to forming the basic waveform shape, controller 1 commands cyclo-converter 7 to control the scale of the output voltage waveform, i.e., the RMS of the power delivered. Controller 1 commands cyclo-converter 7 to modulate the percentage of a half cycle that is used for freewheeling periods in such a way that the output voltage waveform is scaled in magnitude according to a desired peak sinusoid amplitude.

At the end of an eight and one-third millisecond half waveform cycle period, a zero crossing occurs and the eight and one-third millisecond half waveform cycle period is repeated with the voltages on nodes U and V reversed.

With this cyclo-converter operation, an arbitrary output waveform can be provided at an arbitrary but predetermined frequency defined by controller. The predetermined frequency can be any frequency from dc to just below the HF inverter cycle frequency (e.g., 3,000 Hz to 30,000 Hz).

SUMMARY OF THE INVENTION

An embodiment of a method of the invention includes controlling the cyclo-converter 7 in coordination with controlling a coupled HF inverter 3. The controlling of the cyclo-converter 7 provides at least a first freewheeling FW period in the cyclo-converter for each cycle of the HF inverter 3. The controlling of the HF inverter provides a freewheeling period in the HF inverter 3 each time the first freewheeling period is provided in the cyclo-converter.

In an embodiment of a processor readable media of the invention, the media contains logic modules capable of controlling a processor. A first module is capable of controlling the processor to control a cyclo-converter to provide at least a first freewheeling period in the cyclo-converter for each cycle of an HF inverter. A second module is capable of controlling the processor to control the HF inverter to provide a freewheeling period in the HF inverter each time the first freewheeling period is provided in the cyclo-converter.

An embodiment of a controller of the invention includes a first circuit for controlling a cyclo-converter and a second circuit for controlling an HF invert. The first circuit for controlling the cyclo-converter provides at least a first freewheeling period in the cyclo-converter for each cycle of the HF inverter The second circuit for controlling the HF inverter provides a freewheeling period in the HF inverter each time the first freewheeling period is provided in the cyclo-converter

BRIEF DESCRIPTION OF DRAWINGS

The invention will be described in detail in the following description of preferred embodiments with reference to the following figures.

DETAILED DESCRIPTION OF PREFERRED EMBODIMENTS

With the above described known commutation scheme, the HF transformers must be sized to receive the full dc line voltage for a 50% duty cycle. The magnetic material in the transformer must be sized to avoid saturation for the length of the applied power pulses. This scheme also has an HF output inductor current commutation problem during low frequency zero current detection resulting in premature burnout of commutation components and noise.

However, in the present invention, controller 1 controls the HF inverter 3 and the cyclo-converter 7 so that a more economical transformer 5 may be employed. Controller 1 controls the switches S1, S2, S3 and S4 of the HF inverter 3 (FIG. 2) so that either switches S1 and S3, or switches S2 and S4, are on whenever cyclo-converter 7 is in a freewheeling FW period. This ensures that the voltage across the primary of HF transformer 5 is shorted to zero when cyclo-converter 7 is in a freewheeling period. HF inverter 3 is forced into a freewheeling period whenever cyclo-converter 7 is in a freewheeling period. Both terminals on the primary of the HF transformer are shorted to either the positive side of the de source or the negative side of the dc source.

The peak flux in the HF transform is given by:

$$\beta = KDV,$$

where K is a proportionality constant D is the duty cycle and V is the input line voltage applied across the primary. As duty cycle decreases, the peak flux $\beta$ also decreases. Thus, a more economical transformer can be used when the duty cycle is limited. The present invention exploits the freewheeling periods of cyclo-converter 7 to lower the duty cycle, D, of the HF inverter In an embodiment of a method of the invention, the method includes controlling the cyclo-converter 7 in coordination with controlling a coupled HF inverter 3. The controlling of the cyclo-converter 7 provides at least a first freewheeling FW period in the cyclo-converter for each cycle of the HF inverter 3. The controlling of the HF inverter provides a freewheeling period in the HF inverter 3 each time the first freewheeling period is provided in the cyclo-converter.

Figure 10:
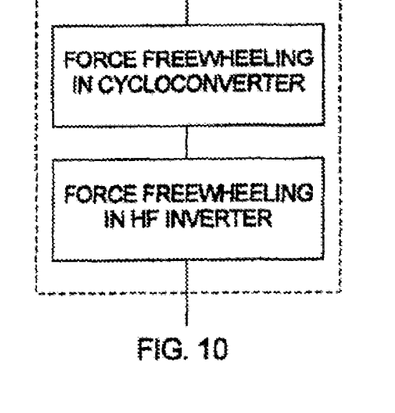
FIG. 10 is a flow chart showing an embodiment of the control scheme according to the present invention.
Figure 12:
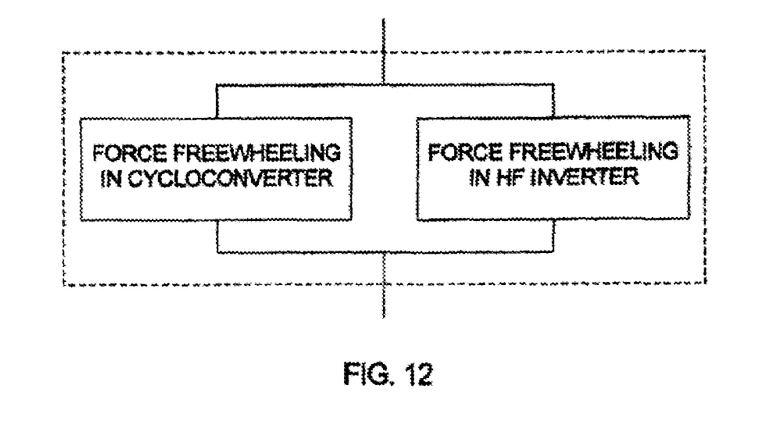
FIG. 12 is a flow chart showing yet another embodiment of the control scheme according to the present invention.

For example, FIG. 10 depicts a method that includes controlling the cyclo-converter 7 in coordination with controlling a coupled HF inverter 3. In FIG. 10, the freewheeling periods are forced on cyclo-converter and the HF inverter. The duration of the freewheeling period as a percentage of one half cycle is a function of the amount of power to be transferred and is determined by other parts of the controller, or a separate controller, that responds to the load conditions and the power commands of the operator. However, once the percentage of a half cycle is determined, the duration of the freewheeling period is superimposed on the control of the cyclo-converter and the HF inverter. In FIG. 10, the freewheeling period is first imposed on the cyclo-converter then imposed on the HF inverter. However, the lag time between these two events is typically very short, on the order of microseconds, to maximize the efficiency of the system. Even the simplest and lowest power microprocessors can change states in a few microseconds. Controller 1 might also superimpose the freewheeling period on the control of the cyclo-converter and the HF inverter at substantially the same time as depicted in FIG. 12.

In a variant of the embodiment of the method, the method further includes controlling the cyclo-converter to provide a second freewheeling period and controlling the HF inverter to provide another freewheeling period. The controlling of the cyclo-converter to provide a second freewheeling period provides the second freewheeling period in the cyclo-converter for each cycle of the HF inverter. The controlling of the HF inverter to provide another freewheeling period provides the other freewheeling period in the HF inverter each time the second freewheeling period is provided in the cyclo-converter.

Figure 11:
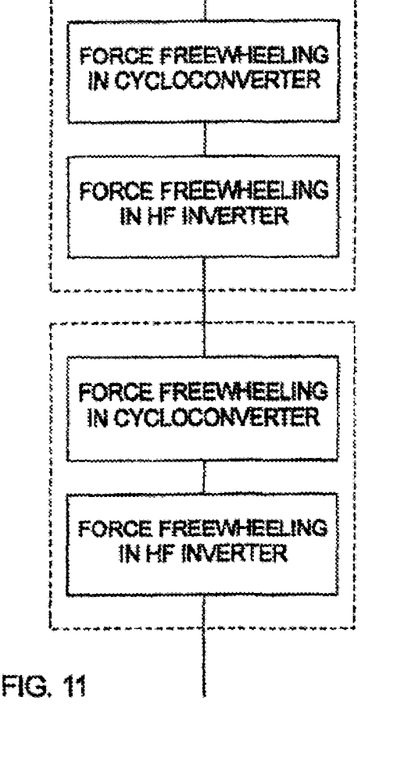
FIG. 11 is a flow chart showing another embodiment of the control scheme according to the present invention.

FIG. 11 depicts a method in which a first freewheeling period is imposed on the control of both the cyclo-converter and the HF inverter in rapid succession, then a time delay later, a second freewheeling period is imposed on the control of both the cyclo-converter and the HF inverter.

In an example of the variant of the embodiment of the method, the cyclo-converter is controlled so that the first freewheeling period occurs within a first half cycle of each cycle of the HF inverter and the second freewheeling period occurs within a second half cycle of each cycle of the HF inverter For example, see FIG. 7.

In an embodiment of a processor readable media of the invention, the media contains logic modules capable of controlling a processor. A first module is capable of controlling the processor to control a cyclo-converter to provide at least a first freewheeling period in the cyclo-converter for each cycle of an HF inverter. A second module is capable of controlling the processor to control the HF inverter to provide a freewheeling period in the HF inverter each time the first freewheeling period is provided in the cyclo-converter.

In a variant of the embodiment of a processor readable media of the invention, the media further includes a third module capable of controlling the processor to control the cyclo-converter to provide a second freewheeling period in the cyclo-converter for each cycle of the HF inverter and a fourth module capable of controlling the processor to control the, HF inverter to provide another freewheeling period in the HF inverter each time the second freewheeling period is provided in the cyclo-converter In an example of the variant of the embodiment of a processor readable media of the invention, the first and third modules are further capable of controlling the processor so that the first freewheeling period occurs within a first half cycle of each cycle of the HF inverter and the second freewheeling period occurs within a second half cycle of each cycle of the HF inverter.

In an embodiment of a controller of the invention, the controller includes a first circuit 12 (See FIG. 1) for controlling a cyclo-converter and a second circuit 14 See FIG. 1 for controlling an HF inverter. The first circuit 12 for controlling the cyclo-converter provides at least a first freewheeling period in the cyclo-converter for each cycle of the HF inverter. The second circuit 14 for controlling the HF inverter provides a freewheeling period in the HF inverter each time the first freewheeling period is provided in the cyclo-converter.

The circuit that makes up controller 1 may be comprised of a set of drivers plus a microcomputer, an ordinary processor, an application specific integrated circuit (ASIC) or an equivalent circuit made from discrete components. The controller is simply a sequential machine that provides the control signals to turn on and off the 16 active switch elements in the cyclo-converter 7 and the four active switch elements in the HF inverter. For example, an embodiment of the present invention is the program that is run in the controller.

In a variant of the embodiment of a controller of the invention, the controller further includes a third circuit 16 See FIG. 1 for controlling the cyclo-converter to provide a second freewheeling period in the cyclo-converter for each cycle of the HF inverter and a fourth circuit 18 (See FIG. 1) for controlling the HF inverter to provide another freewheeling period in the HF inverter each time the second freewheeling period is provided in the cyclo-converter.

In an example of the variant of the embodiment of a controller of the invention, the controller first and third circuits further control the cyclo-converter so that the first freewheeling period occurs within a first half cycle of each cycle of the HF inverter and the second freewheeling period occurs within a second half cycle of each cycle of the HF inverter.

Having described preferred embodiments of a novel control scheme for a dc/ac cyclo-converter (which are intended to be illustrative and not limiting), it is noted that modifications and variations can be made by persons skilled in the art in light of the above teachings. It is therefore to be understood that changes may be made in the particular embodiments of the invention disclosed which are within the scope of the Invention as defined by the appended claims.

Having thus described the invention with the details and particularity required by the patent laws, what is claimed and desired protected by Letters Patent is set forth in the appended claims.

What is claimed is:

1. A method, comprising:
  controlling a cyclo-converter to provide at least a first freewheeling period in the cyclo-converter for each cycle of an HF inverter; and
  controlling the HF inverter to provide a freewheeling period in the HF inverter each time the first freewheeling period is provided in the cyclo-converter.

2. A method according to claim 1, further comprising:
  controlling the cyclo-converter to provide a second freewheeling period in the cyclo-converter for each cycle of the HF inverter; and
  controlling the HF inverter to provide another freewheeling period in the HF inverter each time the second freewheeling period is provided in the cyclo-converter.

3. A method according to claim 2, wherein the cyclo-converter is controlled so that:
  the first freewheeling period occurs within a first half cycle of each cycle of the HF inverter; and
  the second freewheeling period occurs within a second half cycle of each cycle of the HF inverter.

4. A processor readable medium that contains logic modules for controlling a processor, the logic modules comprising:
  a first module controlling the processor to control a cyclo-converter to provide at least a first freewheeling period in the cyclo-converter for each cycle of an HF inverter; and
  a second module controlling the processor to control the HF inverter to provide a freewheeling period in the HF inverter each time the first freewheeling period is provided in the cyclo-converter.

5. A medium according to claim 4, further comprising:
  a third module controlling the processor to control the cyclo-converter to provide a second freewheeling period in the cyclo-converter for each cycle of the HF inverter; and
  a fourth module controlling the processor to control the HF inverter to provide another freewheeling period in the HF inverter each time the second freewheeling period is provided in the cyclo-converter.

6. A medium according to claim 5, wherein the first and third modules are further for controlling the processor so that:
  the first freewheeling period occurs within a first half cycle of each cycle of the HF inverters; and
  the second freewheeling period occurs within a second half cycle of each cycle of the HF inverter.

7. A controller comprising:

a first means for controlling a cyclo-converter to provide at least a first freewheeling period in the cyclo-converter for each cycle of an HF inverter; and a second means for controlling the HF inverter to provide a freewheeling period in the HF inverter each time the first freewheeling period is provided in the cyclo-converter.

8. A controller according to claim 7, further comprising:

a third means for controlling the cyclo-converter to provide a second freewheeling period in the cyclo-converter for each cycle of the HF inverter; and a fourth means for controlling the HF inverter to provide another freewheeling period in the HF inverter each time the second freewheeling period is provided in the cyclo-converter.

9. A controller according to claim 8, wherein the first and third means control the cyclo-converter so that:

the first freewheeling period occurs within a first half cycle of each cycle of the HF inverter; and the second freewheeling period occurs within a second half cycle of each cycle of the HF inverter.

* * * * *